(12) United States Patent
Mehaffey et al.

(10) Patent No.: US 9,801,470 B2
(45) Date of Patent: Oct. 31, 2017

(54) MOLDED CHAIR WITH INTEGRATED SUPPORT AND METHOD OF MAKING SAME

(71) Applicant: HNI Technologies Inc., Muscatine, IA (US)

(72) Inventors: David Mehaffey, Muscatine, IA (US); Jeremy Rolfs, Sylvan Lake, MI (US)

(73) Assignee: HNI Technologies Inc., Muscatine, IA (US)

( * ) Notice: Subject to any disclaimer, the term of this patent is extended or adjusted under 35 U.S.C. 154(b) by 0 days.

(21) Appl. No.: 14/515,340

(22) Filed: Oct. 15, 2014

(65) Prior Publication Data

US 2016/0106216 A1   Apr. 21, 2016

(51) Int. Cl.
| A47C 3/12 | (2006.01) |
| B29C 45/17 | (2006.01) |
| B29K 101/12 | (2006.01) |
| B29L 31/00 | (2006.01) |

(52) U.S. Cl.
CPC ............ *A47C 3/12* (2013.01); *B29C 45/1704* (2013.01); *B29K 2101/12* (2013.01); *B29L 2031/771* (2013.01)

(58) Field of Classification Search
CPC .............................. A47C 3/12; B29C 45/1704
USPC ............. 297/452.12, 452.13, 452.14, 452.15
See application file for complete search history.

(56) References Cited

U.S. PATENT DOCUMENTS

| 186,462 A | 1/1877 | Clay |
| 909,751 A | 1/1909 | Butcher et al. |
| 1,290,532 A | 1/1919 | Fischer |
| 1,376,382 A | 4/1921 | Horine |
| 2,312,030 A | 2/1943 | Cramer et al. |
| 2,471,024 A | 5/1949 | Cramer |
| 2,796,920 A | 6/1957 | Cowles |
| 2,808,875 A * | 10/1957 | Bargen ..................... A47C 7/16 297/183.1 |
| 2,893,469 A | 7/1959 | Eames et al. |
| 3,102,753 A | 9/1963 | Schliephacke |

(Continued)

FOREIGN PATENT DOCUMENTS

| BD | 1302 S | 2/2015 |
| CA | 159333 S | 7/2015 |

(Continued)

OTHER PUBLICATIONS

"Moroso racconta:—Supernatural", 2005, Ross Lovegrove Design, retrieved from http://www.moroso.it/famiglia/supernatural/?lang=Jan. 14, 2015, 13 pages.

(Continued)

*Primary Examiner* — Anthony D Barfield
(74) *Attorney, Agent, or Firm* — Faegre Baker Daniels LLP (57) ABSTRACT

A molded chair assembly includes a molded chair shell and a plurality of legs coupled to the molded chair shell. The molded chair shell further includes a plurality of individual and separate integrated hollow support members extending along the molded chair shell and providing the same with increased durability and stability, while maintaining flexibility. The integrated hollow support members may be formed in a gas assist injection molding process conducted in association with an injection molding process to form the molded chair shell.

20 Claims, 9 Drawing Sheets

(56) References Cited

U.S. PATENT DOCUMENTS

| | | |
|---|---|---|
| D202,550 S | 10/1965 | Kramer |
| 3,258,259 A | 6/1966 | Bohlin |
| 3,453,024 A | 7/1969 | Williams |
| 3,565,482 A | 2/1971 | Blodee |
| 3,669,496 A * | 6/1972 | Chisholm ............... A47C 5/12 297/452.15 |
| 3,669,499 A * | 6/1972 | Semplonius ............. A47C 3/12 297/452.14 |
| 3,734,561 A * | 5/1973 | Barecki .................... A47C 3/00 297/452.14 |
| 4,014,507 A | 3/1977 | Swenson |
| 4,088,367 A * | 5/1978 | Atkinson ................ A47C 5/12 297/183.8 |
| 4,123,105 A * | 10/1978 | Frey ........................ A47C 5/12 297/452.14 |
| 4,155,592 A | 5/1979 | Tsuda et al. |
| 4,168,050 A | 9/1979 | Nerem et al. |
| D255,184 S | 6/1980 | Locher |
| 4,429,917 A | 2/1984 | Diffrient |
| 4,502,729 A | 3/1985 | Locher |
| 4,623,193 A | 11/1986 | Lieker |
| 4,653,806 A | 3/1987 | Willi |
| 4,761,033 A | 8/1988 | Lanuzzi et al. |
| 4,773,706 A | 9/1988 | Hinrichs |
| 4,805,962 A * | 2/1989 | Sacco .................... B60N 2/242 297/452.14 |
| 4,865,384 A | 9/1989 | Desanta |
| 4,909,472 A | 3/1990 | Piretti |
| 4,962,962 A | 10/1990 | Machate et al. |
| 4,988,145 A | 1/1991 | Engel |
| 5,029,942 A | 7/1991 | Rink |
| 5,110,182 A | 5/1992 | Beauvais |
| 5,150,948 A | 9/1992 | Volkle |
| 5,277,865 A | 1/1994 | Hara et al. |
| 5,286,083 A * | 2/1994 | Mattison ................ A47C 7/425 297/230.12 |
| 5,308,144 A | 5/1994 | Korn |
| 5,366,274 A | 11/1994 | Roericht et al. |
| D360,083 S | 7/1995 | Lohmeyer |
| 5,486,035 A | 1/1996 | Koepke et al. |
| 5,507,559 A | 4/1996 | Lance |
| 5,599,069 A | 2/1997 | Lorbiecki |
| 5,601,337 A | 2/1997 | Choda et al. |
| 5,649,740 A | 7/1997 | Hodgdon |
| 5,660,439 A | 8/1997 | Unwalla |
| 5,716,098 A | 2/1998 | Lance |
| 5,755,488 A | 5/1998 | Beda et al. |
| 5,772,282 A | 6/1998 | Stumpf et al. |
| 5,775,774 A | 7/1998 | Okano |
| 5,797,652 A | 8/1998 | Darbyshire |
| 5,810,438 A * | 9/1998 | Newhouse ............. A47C 7/445 297/286 |
| 5,810,440 A | 9/1998 | Unwalla |
| 5,826,940 A | 10/1998 | Hodgdon |
| 5,934,758 A | 8/1999 | Ritch et al. |
| RE36,335 E | 10/1999 | Perry |
| 5,979,984 A | 11/1999 | DeKraker et al. |
| 2,030,037 A | 2/2000 | Ritch et al. |
| 6,035,901 A | 3/2000 | Stumpf et al. |
| 6,089,669 A * | 7/2000 | Wilcox .................... A47C 1/12 297/DIG. 2 |
| 6,142,566 A | 11/2000 | Ritch et al. |
| 6,176,548 B1 | 1/2001 | Thole et al. |
| 6,254,186 B1 | 7/2001 | Falzon |
| 6,286,900 B1 | 9/2001 | Roark |
| 6,286,901 B1 | 9/2001 | Ritch et al. |
| 6,296,309 B1 | 10/2001 | Kurtz |
| 6,318,800 B1 | 11/2001 | DeKraker |
| 6,367,876 B2 | 4/2002 | Caruso et al. |
| 6,367,877 B1 | 4/2002 | Knoblock et al. |
| 6,394,545 B2 | 5/2002 | Knoblock et al. |
| 6,394,546 B1 | 5/2002 | Knoblock et al. |
| 6,394,548 B1 | 5/2002 | Battey et al. |
| 6,394,549 B1 | 5/2002 | DeKraker et al. |
| 6,474,737 B1 | 11/2002 | Canteleux et al. |
| 6,511,128 B2 | 1/2003 | Piretti |
| 6,513,874 B1 | 2/2003 | Sander et al. |
| 6,523,898 B1 | 2/2003 | Ball et al. |
| 6,565,153 B2 | 5/2003 | Hensel et al. |
| 6,568,760 B2 | 5/2003 | Davis et al. |
| 6,572,190 B2 | 6/2003 | Koepke et al. |
| D476,821 S | 7/2003 | Koepke et al. |
| 6,588,842 B2 | 7/2003 | Stumpf et al. |
| 6,609,755 B2 | 8/2003 | Koepke et al. |
| 6,616,231 B2 | 9/2003 | Koepke et al. |
| 6,626,497 B2 | 9/2003 | Nagamitsu et al. |
| 6,644,741 B2 | 11/2003 | Nelson et al. |
| 6,669,292 B2 | 12/2003 | Koepke et al. |
| 6,688,692 B2 | 2/2004 | Phillips et al. |
| 6,709,057 B2 | 3/2004 | Sander et al. |
| 6,709,058 B1 | 3/2004 | Diffrient |
| 6,709,060 B1 | 3/2004 | Su |
| 6,722,741 B2 | 4/2004 | Stumpf et al. |
| 6,729,691 B2 | 5/2004 | Koepke et al. |
| 6,739,664 B2 | 5/2004 | Kinoshita et al. |
| 6,742,839 B2 | 6/2004 | Piretti |
| 6,749,261 B2 | 6/2004 | Knoblock et al. |
| 6,761,406 B2 | 7/2004 | Kinoshita et al. |
| D493,627 S | 8/2004 | Ma |
| 6,802,566 B2 | 10/2004 | Prince et al. |
| 6,817,667 B2 | 11/2004 | Pennington et al. |
| D499,260 S | 12/2004 | Glass et al. |
| 6,840,582 B2 | 1/2005 | Burwell et al. |
| 6,843,530 B1 | 1/2005 | Wu |
| 6,863,346 B2 | 3/2005 | Zund |
| D503,559 S | 4/2005 | Glass et al. |
| 6,874,852 B2 | 4/2005 | Footitt |
| 6,896,329 B2 | 5/2005 | Sander et al. |
| 6,905,171 B2 | 6/2005 | Dammermann et al. |
| 6,908,159 B2 | 6/2005 | Prince et al. |
| 6,913,316 B2 | 7/2005 | Kinoshita et al. |
| 6,935,689 B2 | 8/2005 | Horiki et al. |
| 6,945,602 B2 | 9/2005 | Fookes et al. |
| 6,957,861 B1 | 10/2005 | Chou et al. |
| 6,959,965 B2 | 11/2005 | Diffrient |
| 6,966,604 B2 | 11/2005 | Stumpf et al. |
| D513,911 S | 1/2006 | Glass et al. |
| 6,981,743 B2 | 1/2006 | Edwards et al. |
| 6,986,549 B2 | 1/2006 | Kniese |
| 6,991,291 B2 | 1/2006 | Dammermann et al. |
| 6,994,400 B2 | 2/2006 | Koepke et al. |
| 7,014,269 B2 | 3/2006 | Coffield et al. |
| 7,040,709 B2 | 5/2006 | Dammermann et al. |
| D522,265 S | 6/2006 | Glass et al. |
| 7,063,384 B2 | 6/2006 | Liu |
| 7,066,537 B2 | 6/2006 | Coffield et al. |
| 7,066,538 B2 | 6/2006 | Machael et al. |
| 7,104,604 B1 | 9/2006 | Kang |
| 7,114,777 B2 | 10/2006 | Knoblock et al. |
| 7,131,700 B2 | 11/2006 | Dammermann et al. |
| 7,134,722 B2 | 11/2006 | Ueda et al. |
| 7,147,286 B2 | 12/2006 | Cesaroni et al. |
| D541,063 S | 4/2007 | Su |
| 7,213,880 B2 | 5/2007 | Schmitz et al. |
| 7,213,886 B2 | 5/2007 | Schmitz et al. |
| D544,230 S | 6/2007 | Glass et al. |
| 7,234,772 B2 | 6/2007 | Wells |
| 7,249,802 B2 | 7/2007 | Schmitz et al. |
| 7,273,253 B2 | 9/2007 | Deimen et al. |
| 7,281,764 B2 | 10/2007 | Thole |
| 7,296,853 B2 | 11/2007 | Piretti |
| D558,995 S | 1/2008 | Igarashi |
| D559,571 S | 1/2008 | Meda |
| D559,572 S | 1/2008 | Igarashi |
| 7,347,495 B2 | 3/2008 | Beyer et al. |
| D566,979 S | 4/2008 | Cox et al. |
| 7,360,835 B2 | 4/2008 | Tubergen et al. |
| D572,948 S | 7/2008 | Wakasugi et al. |
| 7,419,222 B2 | 9/2008 | Schmitz et al. |
| 7,422,287 B2 | 9/2008 | Heidmann et al. |
| 7,425,037 B2 | 9/2008 | Schmitz et al. |
| 7,441,839 B2 | 10/2008 | Pennington et al. |
| D582,170 S | 12/2008 | Chi |

(56) References Cited

U.S. PATENT DOCUMENTS

| | | |
|---|---|---|
| 7,484,802 B2 | 2/2009 | Beyer et al. |
| 7,517,024 B2 | 4/2009 | Cvek |
| D597,758 S | 8/2009 | Barrett et al. |
| D600,462 S | 9/2009 | Ooki et al. |
| 7,600,814 B2 | 10/2009 | Link |
| 7,600,820 B2 | 10/2009 | Bouche et al. |
| 7,665,805 B2 | 2/2010 | Ueda |
| 7,712,833 B2 | 5/2010 | Ueda |
| 7,717,511 B2 | 5/2010 | Huang |
| 7,717,513 B2 | 5/2010 | Ueda |
| D618,469 S | 6/2010 | Romero |
| 7,726,740 B2 | 6/2010 | Masunaga |
| 7,794,016 B1 | 9/2010 | Lucci et al. |
| 7,798,573 B2 | 9/2010 | Pennington et al. |
| 7,837,265 B2 | 11/2010 | Machael et al. |
| 7,841,666 B2 | 11/2010 | Schmitz et al. |
| 7,850,241 B1 | 12/2010 | Lucci et al. |
| 7,857,388 B2 * | 12/2010 | Bedford .............. A47C 7/40 297/284.2 |
| 7,878,591 B2 | 2/2011 | Walker et al. |
| D639,576 S | 6/2011 | Breen |
| 7,971,936 B2 | 7/2011 | Fukai |
| D643,641 S | 8/2011 | Figueroa |
| D643,642 S | 8/2011 | Figueroa |
| 7,992,937 B2 | 8/2011 | Plikat et al. |
| 7,997,652 B2 | 8/2011 | Roslund et al. |
| D646,092 S | 10/2011 | Romero |
| 8,029,060 B2 | 10/2011 | Parker et al. |
| D648,561 S | 11/2011 | Johansson |
| D648,564 S | 11/2011 | Johansson |
| 8,061,775 B2 | 11/2011 | Diffrient |
| D649,795 S | 12/2011 | Izawa |
| 8,075,058 B2 | 12/2011 | Baumann |
| D652,223 S | 1/2012 | Fujita |
| 8,210,611 B2 | 7/2012 | Aldrich et al. |
| 8,215,710 B2 | 7/2012 | Erker |
| 8,251,448 B2 | 8/2012 | Machael et al. |
| 8,262,162 B2 | 9/2012 | Castro et al. |
| 8,297,701 B2 | 10/2012 | Machael et al. |
| 8,313,478 B2 | 11/2012 | Tockman et al. |
| D671,759 S | 12/2012 | Hurford |
| D676,254 S | 2/2013 | Chen |
| 8,414,073 B2 | 4/2013 | Schmitz et al. |
| D683,558 S | 6/2013 | Rada et al. |
| 8,480,171 B2 | 7/2013 | Chadwick et al. |
| D688,483 S | 8/2013 | Aratani |
| 8,544,951 B2 | 10/2013 | Machael et al. |
| 8,550,557 B2 | 10/2013 | Bock |
| 8,616,640 B2 | 12/2013 | van Hekken |
| D696,886 S | 1/2014 | Nakamura |
| D701,068 S | 3/2014 | Usumoto et al. |
| 8,663,514 B2 | 3/2014 | Deskevich et al. |
| D704,944 S | 5/2014 | Koepke et al. |
| D706,067 S | 6/2014 | Romero |
| D707,460 S | 6/2014 | Giugiaro |
| D707,461 S | 6/2014 | Rada et al. |
| D714,070 S | 9/2014 | Cvek |
| D715,068 S | 10/2014 | Chan |
| D718,544 S | 12/2014 | Lu |
| D731,833 S | 6/2015 | Fifield et al. |
| D743,180 S | 11/2015 | Mehaffey et al. |
| D759,414 S | 6/2016 | Mehaffey et al. |
| 2002/0043843 A1 | 4/2002 | Pennington et al. |
| 2002/0190552 A1 | 12/2002 | Koepke et al. |
| 2002/0190553 A1 | 12/2002 | Koepke et al. |
| 2002/0190564 A1 | 12/2002 | Coffield et al. |
| 2003/0001425 A1 | 1/2003 | Koepke et al. |
| 2003/0075961 A1 | 4/2003 | Struppler et al. |
| 2003/0107252 A1 | 6/2003 | Kinoshita et al. |
| 2003/0127896 A1 | 7/2003 | Deimen et al. |
| 2003/0137173 A1 | 7/2003 | Kinoshita et al. |
| 2004/0017102 A1 | 1/2004 | Igarashi et al. |
| 2005/0062323 A1 | 3/2005 | Dicks |
| 2005/0093354 A1 | 5/2005 | Ball et al. |
| 2005/0121954 A1 | 6/2005 | Coffield et al. |
| 2005/0168041 A1 * | 8/2005 | Glance .............. B60N 2/68 297/452.18 |
| 2005/0231013 A1 | 10/2005 | Knoblock et al. |
| 2005/0269848 A1 | 12/2005 | Harley |
| 2006/0001303 A1 | 1/2006 | Raftery et al. |
| 2006/0006715 A1 | 1/2006 | Chadwick et al. |
| 2006/0033369 A1 | 2/2006 | Eysing |
| 2006/0103208 A1 | 5/2006 | Schmitz et al. |
| 2006/0181126 A1 | 8/2006 | Eysing |
| 2007/0057549 A1 | 3/2007 | Ball et al. |
| 2007/0108818 A1 | 5/2007 | Ueda et al. |
| 2007/0108819 A1 | 5/2007 | Ueda |
| 2007/0108820 A1 | 5/2007 | Ueda et al. |
| 2007/0108821 A1 | 5/2007 | Ueda |
| 2007/0216208 A1 | 9/2007 | Maier et al. |
| 2007/0222266 A1 | 9/2007 | Lucci et al. |
| 2007/0284920 A1 | 12/2007 | Mehaffey et al. |
| 2008/0272636 A1 | 11/2008 | Machael et al. |
| 2008/0315645 A1 | 12/2008 | Hock |
| 2009/0195047 A1 | 8/2009 | Bouche et al. |
| 2009/0273126 A1 | 11/2009 | Scott |
| 2010/0078975 A1 | 4/2010 | Kang |
| 2010/0187891 A1 | 7/2010 | O'Connor et al. |
| 2010/0194160 A1 | 8/2010 | Machael et al. |
| 2010/0283308 A1 | 11/2010 | Deskevich et al. |
| 2010/0295351 A1 | 11/2010 | Bock |
| 2011/0074197 A1 | 3/2011 | Okamoto |
| 2011/0074201 A1 | 3/2011 | Parker et al. |
| 2011/0193384 A1 | 8/2011 | Ni |
| 2011/0198909 A1 | 8/2011 | Fifield |
| 2011/0233979 A1 | 9/2011 | An |
| 2011/0285190 A1 | 11/2011 | Wu |
| 2011/0285191 A1 | 11/2011 | van Hekken |
| 2012/0007400 A1 | 1/2012 | Behar et al. |
| 2012/0025574 A1 | 2/2012 | Wilkinson et al. |
| 2012/0242130 A1 | 9/2012 | Hung |
| 2013/0169014 A1 | 7/2013 | Machael et al. |
| 2014/0191546 A1 | 7/2014 | Machael et al. |
| 2014/0265493 A1 | 9/2014 | Machael et al. |
| 2015/0296989 A1 | 10/2015 | Machael et al. |

FOREIGN PATENT DOCUMENTS

| | | |
|---|---|---|
| CN | 2629546 Y | 9/2004 |
| CN | 201064296 Y | 5/2008 |
| CN | ZL2014303935083 S | 6/2015 |
| DE | 3640336 A1 | 8/1987 |
| DE | 4135603 A1 | 5/1992 |
| DE | 29507658 U1 | 2/1996 |
| DE | 4437394 A1 | 4/1996 |
| DE | 29711329 U1 | 10/1997 |
| DE | 10318759 B3 | 7/2004 |
| DE | 202008016260 U1 | 4/2009 |
| EP | 0574375 A1 | 12/1993 |
| EP | 0688522 A1 | 12/1995 |
| EP | 0970639 A1 | 1/2000 |
| EP | 1232703 B1 | 8/2002 |
| EP | 1768516 B1 | 4/2007 |
| EP | 2110051 A1 | 10/2009 |
| EP | 2622991 A1 | 8/2013 |
| JP | 2004049658 A | 2/2004 |
| JP | 2004049691 A | 2/2004 |
| JP | 2004298434 A | 10/2004 |
| KR | 20030059582 A | 7/2003 |
| OM | ID201400020 S | 6/2015 |
| WO | WO9220262 A1 | 11/1992 |
| WO | WO02102197 A2 | 12/2002 |
| WO | WO03068025 A2 | 8/2003 |
| WO | WO2004008915 A1 | 1/2004 |
| WO | 2007112236 A1 | 10/2007 |
| WO | WO2013020088 A2 | 2/2013 |
| WO | 2014144143 A1 | 9/2014 |

OTHER PUBLICATIONS

"Alumni Classroom Furniture Brochure", retrieved from http://www.alumnicf.com/ALUMNI_BROCHURE.pdf Jan. 14, 2015, 64 pages.

(56) References Cited

OTHER PUBLICATIONS

"Bernhardt Design, Orbit Ross Lovegrove Brochure", retrieved http://bernhardtdesign.com/pdf/brochures/0031/orbit.pdf from Jan. 14, 2015, 3 pages.
Columbia Medical-Omni™ /Omniverse™ Transfer Systems and Rolling Chair Brochure, Brochure—retrieved from http://www.columbiamedical.com/docs/Omni-OV-order-form-web.pdf Jan. 14, 2015. 2 pages.
"Flototto Pro, Uber Pro", retrieved from http://www.floetotto.de/pro/index.html Jan. 14, 2015. 9 pages.
"Jasper Morrison: Air Chair Brochure", retrieved from http://www.jaspermorrison.com/html/7226891.html Jan. 14, 2015, 1 page.
"Mario Bellini Architects Design, Ultrabellini Chair Brochure", retrieved from http://bellini.it/design/heller_ultrachair.html Jan. 14, 2015, 1 page.
"Smith System—Furniture for Inspired Learning 2014 Catalog", retrieved from http://smithsystem.wpengine.netdna-cdn.com/wp-content/uploads/2014/01/Smithsystem_2014Catalog.pdf Jan. 14, 2015, 129 pages.
"Spaceist Office Furniture", Colorful Stacking CaféChairs, retrieved from http://www.spaceist.co.uk/cafe-bar-furniture/cafe-furniture/cafe-chairs/colourful-cafe-chairs Jan. 14, 2015, 5 pages.
International Search Report and Written Opinion issued in PCT/US2010/022890, dated Jul. 13, 2010, 14 pages.
Seating Solutions Brochure-Ergonomics and Comfort in the 21st Century Learning Enviroment-Vanerum Stelter, retrieved from http://www.vanerumstelter.com/ Jan. 14, 2015, 20 pages.
"Contessa Task" by Teknion, copyright 2003-2004, downloaded from http://www.teknion.com/products/seating, 2 pages.
"Contessa: Ergonomic Concept", Okamura Today, copyright 2000-2004 Okamura Corporation, downloaded from http://www.okamura.co.jp/english/product/office/contessa/concept/index.html, 2 pages.
International Preliminary Report on Patentability issued in PCT/US2014/028431, dated Sep. 24, 2015, 6 pages.
International Search Report and Written Opinion for PCT/US2008/056890 of HNI Technologies Inc., dated Jul. 17, 2008.
International Search Report and Written Opinion issued in PCT/US2007/064413, dated Aug. 16, 2007, 11 pages.
International Search Report and Written Opinion issued in PCT/US2014/028431, dated Jul. 7, 2014, 9 pages.
International Search Report and Written Opinion issued in PCT/US2015/025546, dated Aug. 14, 2015, 10 pages.

\* cited by examiner

MOLDED CHAIR WITH INTEGRATED SUPPORT AND METHOD OF MAKING SAME

BACKGROUND

The present disclosure relates in general to molded chairs, and more particularly, to a molded chair having support members integral to the seat base and back support.

Molded chairs are well known in the art. However, certain problems exist with many molded chair designs. When a user sits in a chair, the user typically exerts forces on the seat base and the back support portion. Accordingly, molded chair designs that are not properly designed to withstand such forces lack stability and durability, and eventually fail due to overstress or fatigue. Conversely, molded chair designs that are designed to maintain durability are generally cumbersome and heavy, and often times require additional, non-integral structural components that add additional weight. Accordingly, there is a need for a lightweight molded chair that possesses stability, durability, flexibility, as well as aesthetic and ergonomic utility.

SUMMARY

Various aspects of the disclosure relate to chairs, seating systems, and associated methods of manufacture and use. A molded chair, according to some embodiments, includes a seat portion configured to accommodate a seated user, a back portion configured to support a back of the seated user, and a transition portion located between the seat portion and the back portion. The seat portion, the back portion, and the transition portion are integrally formed. The transition portion includes a first support member located at a first side of the transition portion and a second support member located at a second side of the transition portion opposite the first side. The first support member forms a first hollow enclosure and the second support member forms a second hollow enclosure.

While multiple embodiments are disclosed, still other embodiments will become apparent to those skilled in the art from the following detailed description, which shows and describes illustrative embodiments by way of example. Accordingly, the drawings and detailed description are to be regarded as illustrative in nature and not restrictive.

DETAILED DESCRIPTION

Figure 1:
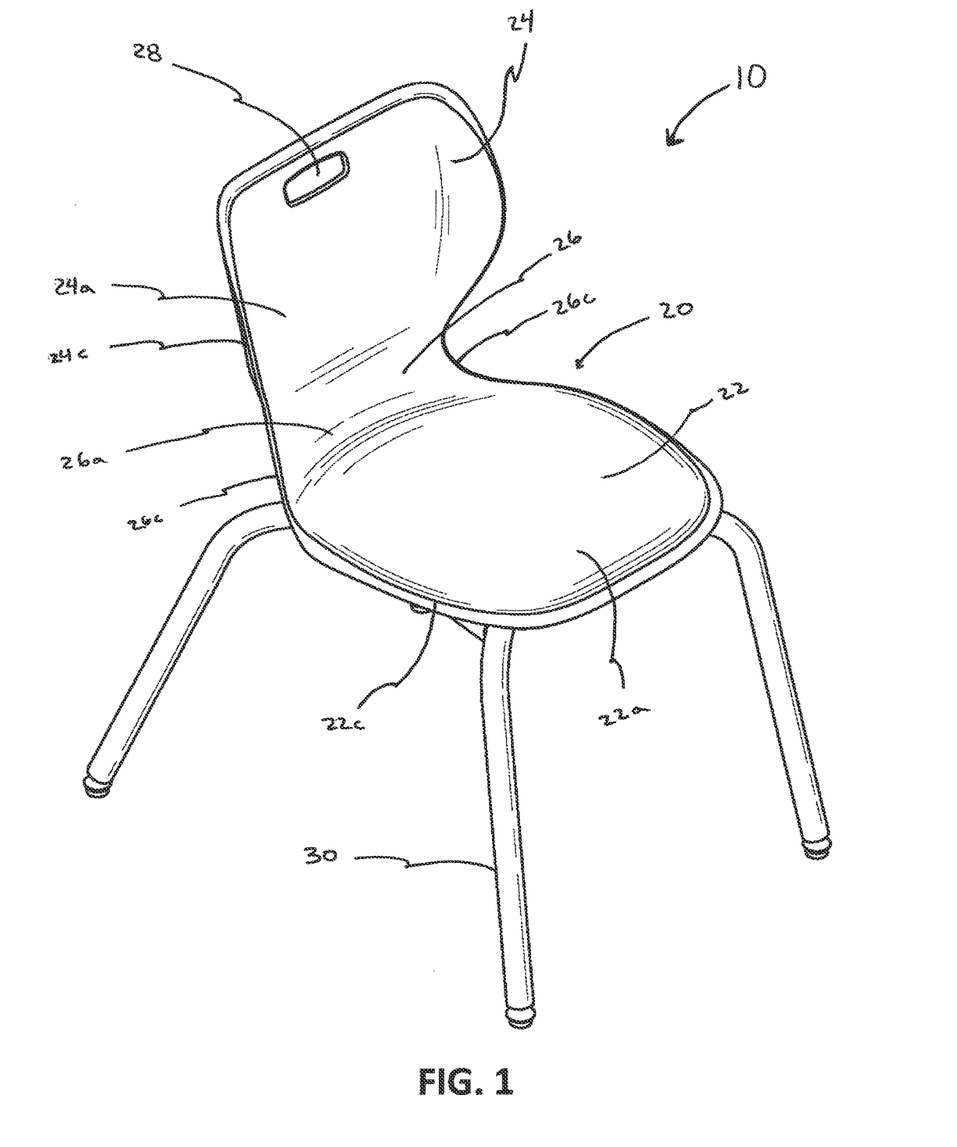
FIG. 1 is a front perspective view of the molded chair, according to some embodiments.

According to some embodiments, the chair assembly (10) includes a molded chair shell (20) and a plurality of chair legs (30), as illustrated in FIG. 1. In some embodiments, the molded chair shell (20) is a single piece of molded material and includes a seat bottom portion (22), a seat back portion (24) and a transition portion (26), wherein the seat bottom portion (22), the seat back portion (24) and the transition portion (26) are integrally formed. Accordingly, the molded chair shell (20) provides a bottom support upon which a user can sit, and a back support for supporting the user's back and a transition area connecting the bottom support with the back support.

In some embodiments, the molded chair shell (20) is comprised of an injection moldable polymer material such as polypropylene, polycarbonate, nylon, or any other suitable injection moldable polymer material. However, any suitable injection moldable material is envisioned and can be used without departing from the spirit or scope of the molded chair assembly (10) disclosed herein. Generally, molded chair shell (20) is formed in an injection molding process, although a variety of manufacturing methods are contemplated. In some embodiments, the chair legs (30) are comprised of a polymer material such as those discussed above, a metal material such as steel or aluminum, or any other material suitable for forming the plurality of chair legs (30).

In various embodiments, the seat bottom portion (22) of the molded chair shell (20) lies generally in the horizontal plane, and may be any size and shape suitable for providing a surface upon which a user may be seated. In some embodiments, the seat bottom portion (22) includes a top side (22a), a bottom side (22b), and a peripheral edge (22c). In some embodiments, the top side (22a) is relatively smooth and continuous such that it provides a comfortable seating surface for a user. In some embodiments, the top side (22a) has a contoured shape that is generally concaved and continuous. In one such embodiment, the bottom side (22b) of the seat bottom portion (22) takes on a contour similar to that of the top side (22a). For example, as illustrated in FIGS. 1, 3, 4, 5, and 6, the bottom side (22b) of the seat bottom portion (22) takes on a contour similar to the concaved contour of the top side (22a) of the seat bottom portion (22). In some embodiments, the seat bottom portion (22) is of a generally uniform thickness across its entire surface area. In another embodiment, the seat bottom portion (22) has a differing thickness across its surface area. For example, the seat bottom portion (22) has a first thickness across a central area and a second different thickness around its periphery. By varying the thickness across the seat bottom portion (22), the molded chair shell (20) can be light weight while maintaining durability, stability, and strength.

Figure 7:
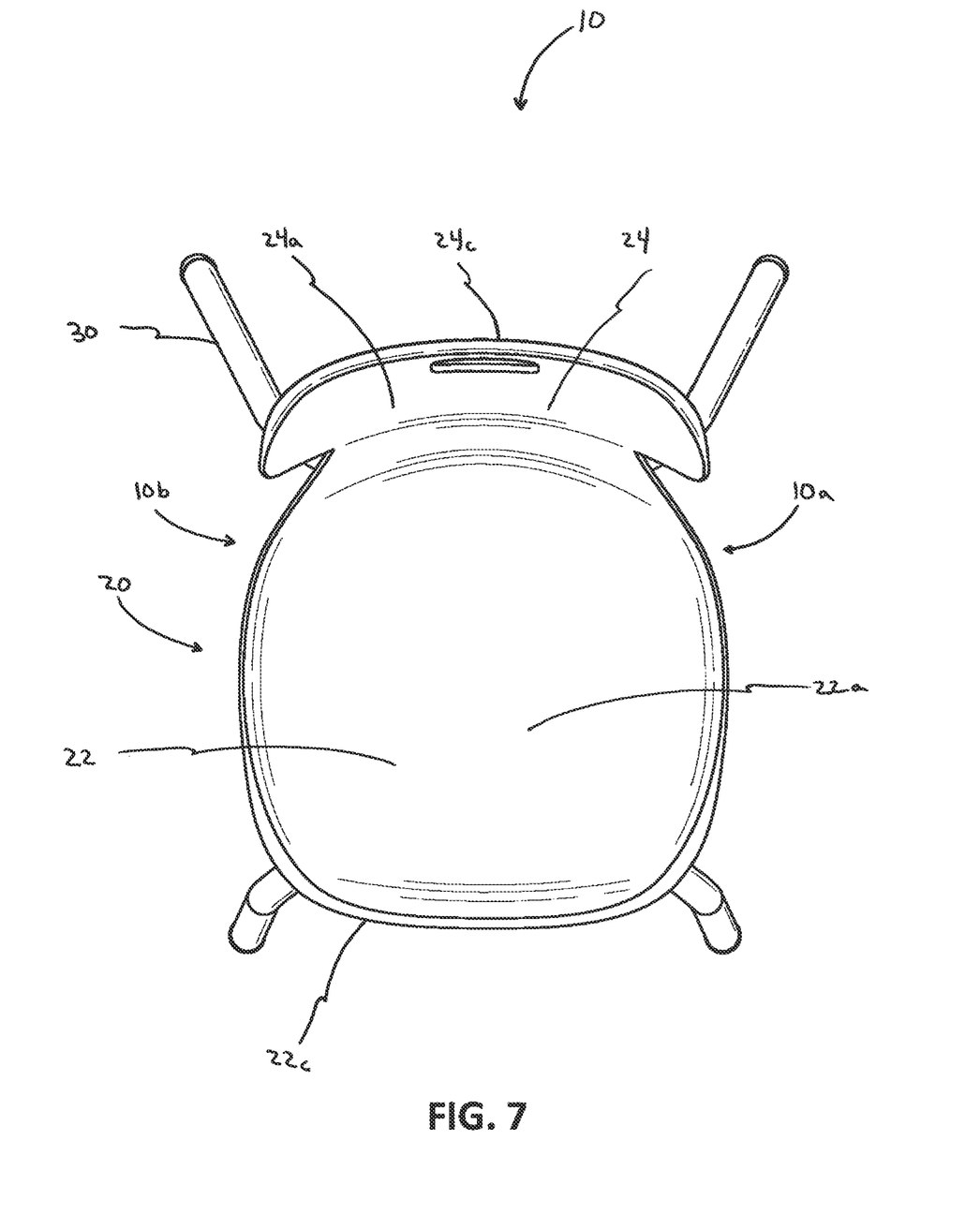
FIG. 7 is a top view of the molded chair illustrated in FIG. 1, according to some embodiments.

In various embodiments, a peripheral edge 22c provides for a transition between the top side (22a) and the bottom side (22b) of the seat bottom portion (22). In some embodiments, the peripheral edge 22c of the seat bottom portion (22) has rounded corners, as is illustrated in FIG. 7. In certain embodiments, as discussed in greater detail below, one or more support members are incorporated into (or are otherwise integrally formed with), and/or extend along a portion of the peripheral edge 22c.

In some embodiments, the seat bottom portion (22) tapers on one end. For example, as illustrated in FIG. 7, at its junction with the transition portion (26), the seat bottom portion (22) tapers to a more narrow width. By narrowing the width of the seat bottom portion (22) in designated areas by eliminating excess material, the overall weight of the molded chair assembly (10) can be reduced without compromising its structural integrity. However, while the seat bottom portion (22) generally tapers on one end, the seat bottom portion (22) need not taper on any end.

Figure 8:
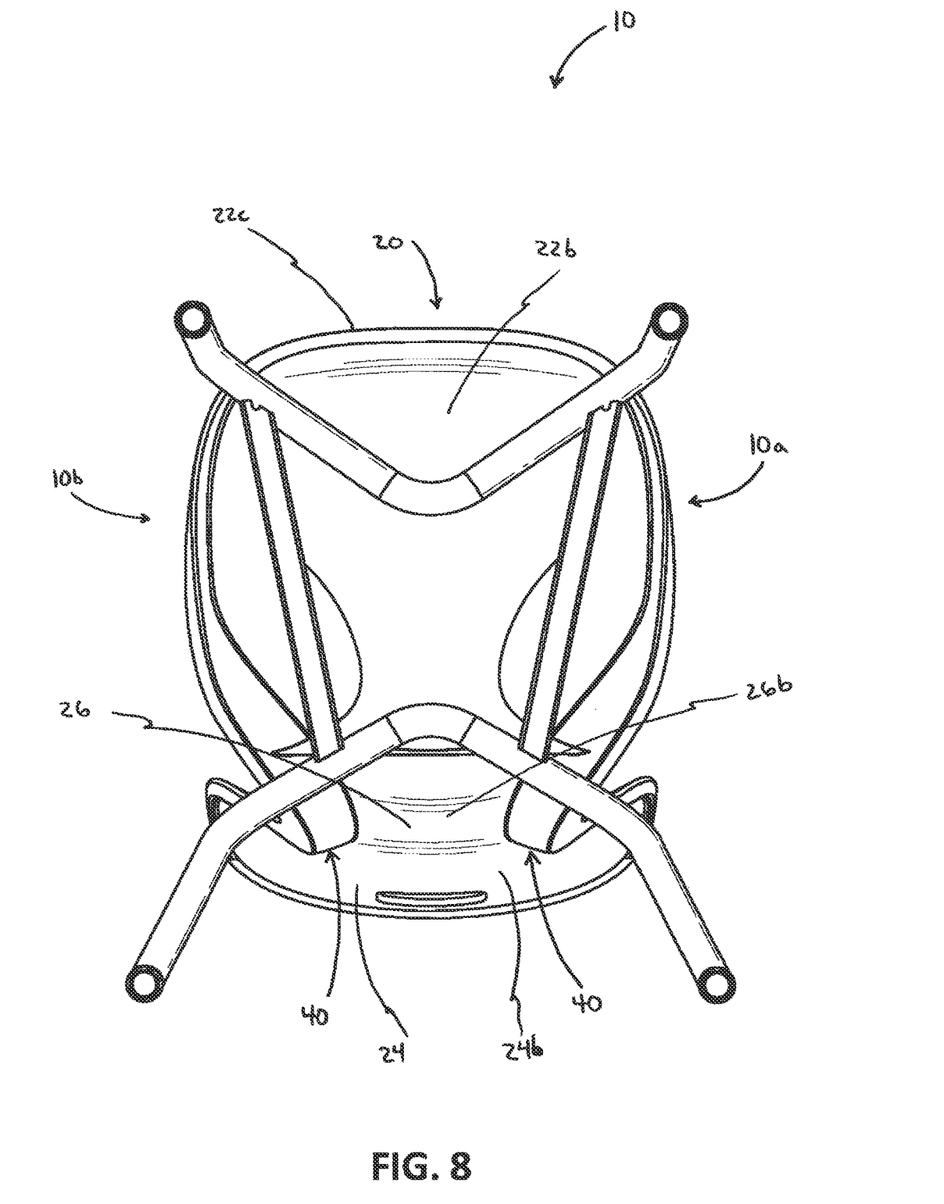
FIG. 8 is a bottom view of the molded chair illustrated in FIG. 1, according to some embodiments.

In some embodiments, the bottom side (22b) of the seat bottom portion (22) is configured to receive a plurality of chair legs (30). For example, as is illustrated in FIG. 8, a plurality of chair legs (30) are fastened to the bottom side (22b) of the seat bottom portion (22) of the molded chair shell (20). In some embodiments, the plurality of chair legs (30) are fastened to the bottom side (22b) via one or more brackets. In one such embodiment, the brackets are integrated into the molded chair shell (20). In other words, the brackets themselves are part of the construction of the molded chair shell (20). In another embodiment, one or more brackets are fastened to the bottom side (22b) of the seat bottom portion (22), and the plurality of chair legs (30) are fastened to the brackets. It should be appreciated that any suitable configuration for fastening the plurality of chair legs (30) to the molded chair shell (20) is envisioned and can be implemented without departing from the spirit or scope of disclosed molded chair assembly (10).

As mentioned above, the molded chair shell (20) also comprises a seat back portion (24). In some embodiments, the seat back portion (24) lies generally in the vertical plane and may be any size and shape suitable for supporting a seated user's back. In some embodiments, the seat back portion (24) includes a front side (24a), a back side (24b), and a peripheral edge (24c). In some embodiments, the front side (24a) is relatively smooth and continuous such that it provides a comfortable surface and adequately supports the back of a seated user. In some embodiments, the front side (24a) has a contoured shape that is generally concaved and continuous. In one such embodiment, the back side (24b) of the seat back portion (24) takes on a contour similar to that of the front side (24a). For example, as illustrated in FIGS. 1, 2, 5, and 6, the back side (24b) of the seat back portion (24) takes on a contour similar to the concaved contour of the front side (24a) of the seat back portion (24). In some embodiments, the seat back portion (24) is of a generally uniform thickness across its entire surface area. In other embodiments, the seat back portion (24) has a differing thickness across its surface area. For example, the seat back portion (24) optionally has a first thickness across a central area and a second different thickness around its periphery. By varying the thickness across the seat back portion (24), the molded chair shell (20) can be light weight while maintaining durability, stability, and strength.

Figure 3:
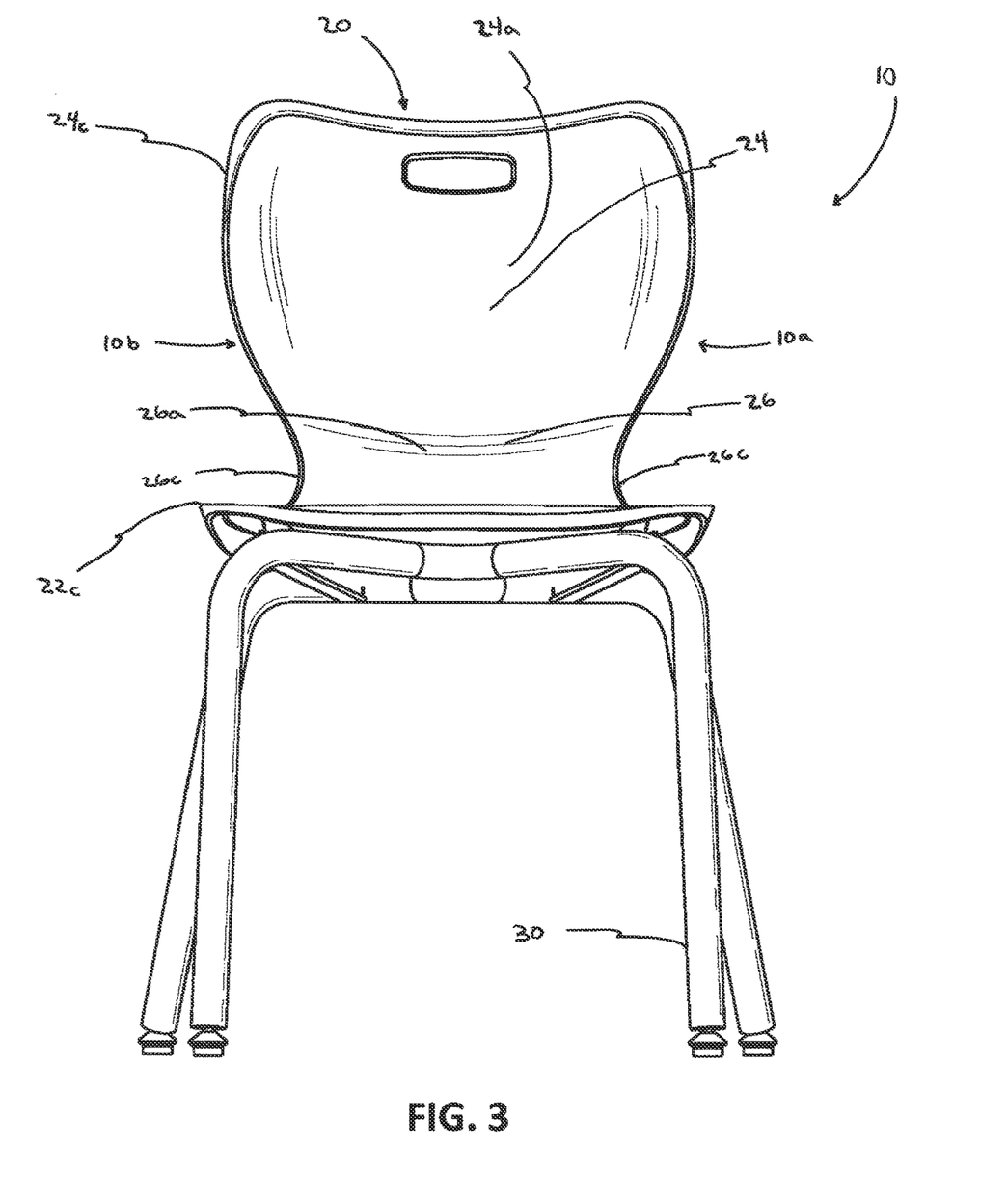
FIG. 3 is a front view of the molded chair illustrated in FIG. 1, according to some embodiments.
Figure 4:
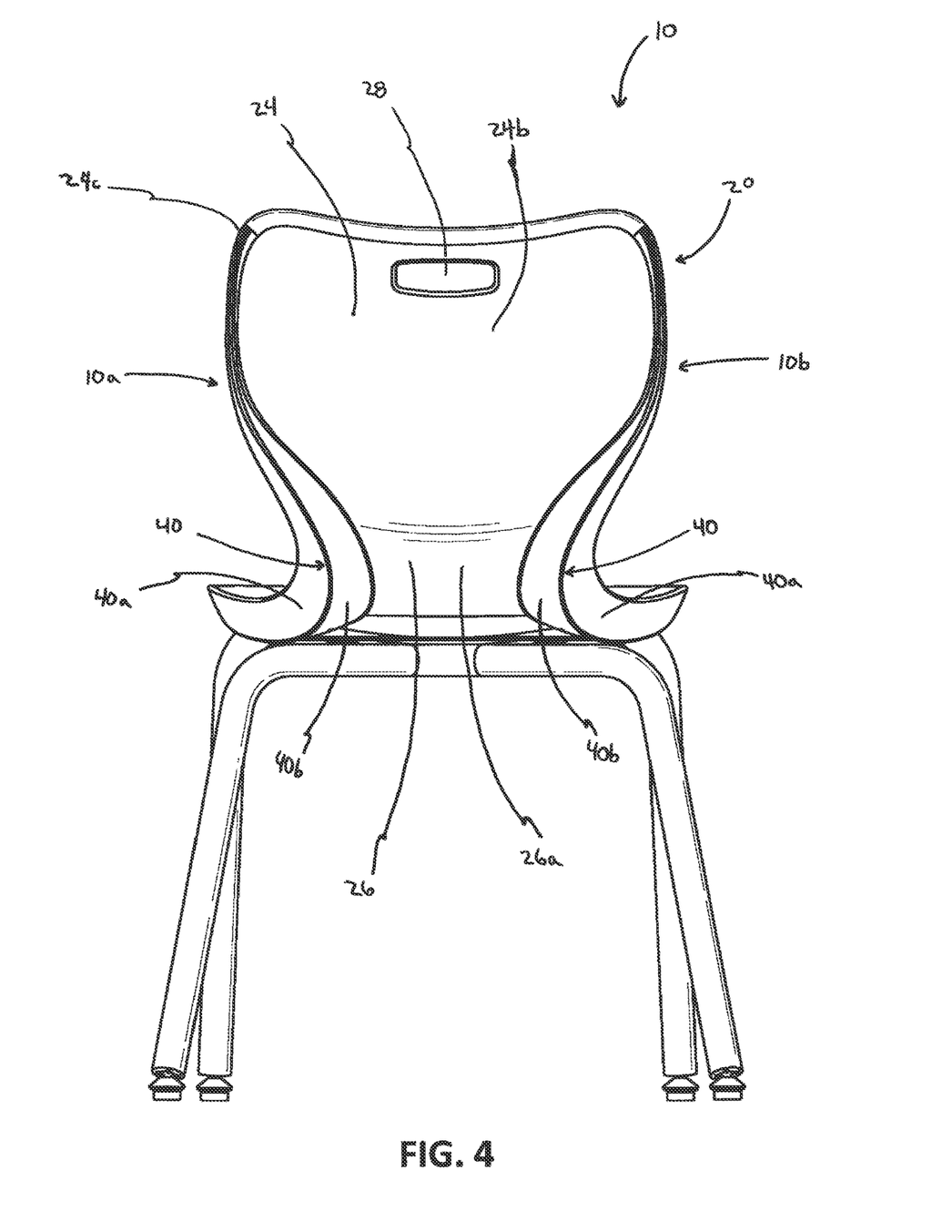
FIG. 4 is a back view of the molded chair illustrated in FIG. 1 and illustrating the integral support members on each side of the chair, according to some embodiments.

In various embodiments, a peripheral edge 24c provides for a transition between the front side (24a) and the back side (24b) of the seat back portion (24). In some embodiments, the peripheral edge 24c has rounded corners, as is illustrated in FIG. 3. In certain embodiments, as discussed in greater detail below, one or more support members are incorporated into, and/or extend along a portion of the peripheral edge 24c. Additionally, or alternatively, the seat back portion includes one or more apertures, which function as a lifting handle for lifting the molded chair assembly (10). For example, as is illustrated in FIGS. 1 and 4, an aperture (28) is located in the seat back portion (24) of the molded chair shell (20) and extends through seat back portion (24) from the front side (24a) to the back side (24b). In this illustrated example, the aperture (28) is located in a top portion of seat back portion (24), however, in various alternative embodiments, apertures may be located at any suitable location of the molded chair shell (20).

In some embodiments, the seat back portion (24) tapers on one end. For example, as illustrated in FIG. 3, at its junction with the transition portion (26), the seat back portion (24) tapers to a more narrow width. By narrowing the width of the seat back portion (24) in designated areas by eliminating excess material, the overall weight of the molded chair assembly (10) can be reduced without compromising its structural integrity. However, while the seat back portion (24) generally tapers on one end, the seat back portion (24) need not taper on any end, or in the alternative, the width of the seat back portion (24) may expand at one or more designated areas.

In various embodiments, the seat bottom portion (22) is connected to the seat back portion (24) via a transition portion (26). For example, as illustrated in FIGS. 1 to 6 transition portion (26) comprises a curvature such that the molded chair shell (20) smoothly and comfortably transitions from the seat back portion (24) (which lies generally in the vertical plane) to the seat bottom portion (22) (which lies generally in the horizontal plane). Accordingly, in various embodiments, the transition portion (26) provides for a designated angular relationship between the seat bottom portion (22) and the seat back portion (24). For example, the transition portion (26) provides that the angle between the seat back portion (24) and the seat bottom portion (22) may be any desired angle. Additionally, as discussed further below, in some embodiments, the transition portion (26), in combination with one or more integrated hollow support members (40), flexes to permit the seat back portion (24) to alter its angular position (or otherwise recline) relative to the seat bottom portion (22) and thus temporarily change its angular relationship relative to the seat bottom portion (22).

In some embodiments, the transition portion (26) includes a front side (26a), a back side (26b), and a plurality of edges (26c). In some embodiments, the transition portion (26) is of a size and shape suitable to properly join the seat back portion (24) with the seat bottom portion (22). Specifically, in some embodiments, the front side (26a) adopts a smooth and continuous curvature such that a transition from the seat bottom portion (22) to the seat back portion (24) is smooth and continuous. In some embodiments, the plurality of edges (26c) facilitate a transition from seat back portion peripheral edge (24c) to seat bottom portion peripheral edge (22c), such that the molded chair shell (20) has a continuous peripheral edge.

In some embodiments, where the transition portion (26) joins to (or otherwise connects or interfaces with) the seat back portion (24), the transition portion (26) conforms to the shape, size, and thickness of the seat back portion (24). Specifically, the transition portion (26) takes on (or otherwise conforms to) the shape of the seat back portion (24) at the joining area such that the transition from the seat back portion (24) to the transition portion (26) is smooth and continuous. Similarly, the transition portion (26) takes on (or otherwise conforms to) the shape of the seat bottom portion (22) at the joining area such that the transition from the transition portion (26) to the seat bottom portion (22) is smooth and continuous.

Figure 5:
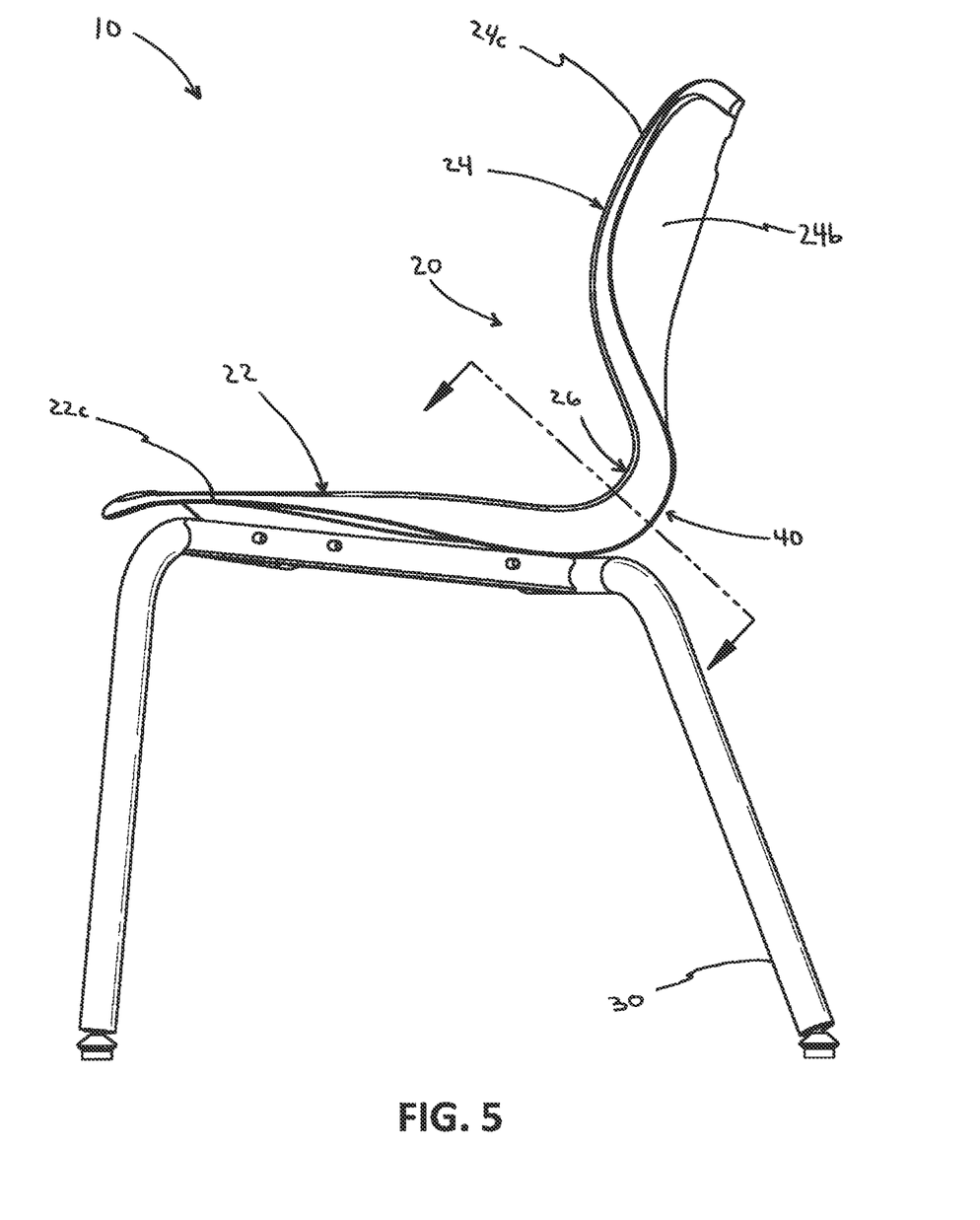
FIGS. 5 and 6 are each side views of the molded chair illustrated in FIG. 1, according to some embodiments.
Figure 6:
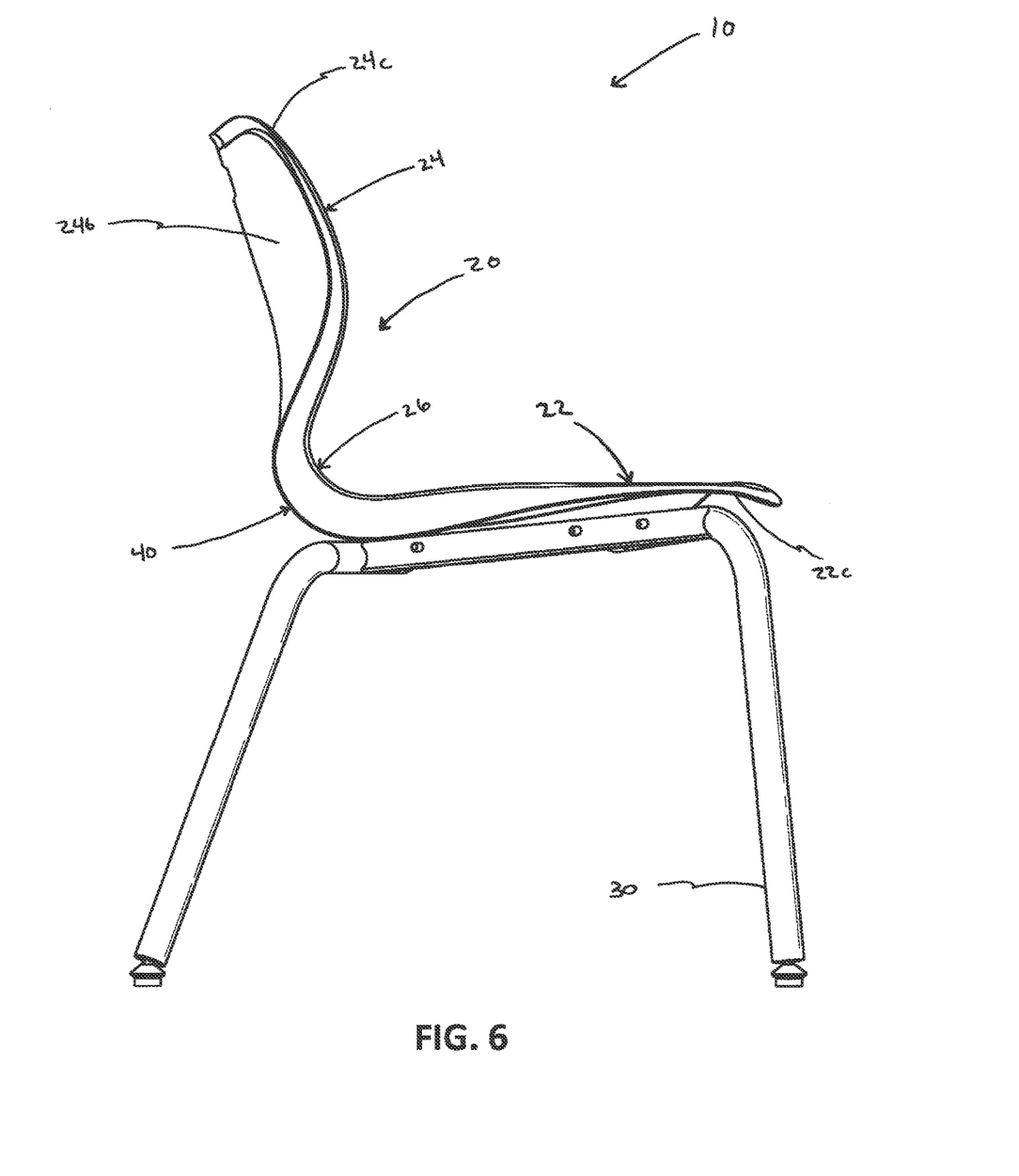

In various embodiments, the transition portion (26) is curved from a generally horizontal plane to a generally vertical plane. For example, as illustrated in FIGS. 5 and 6, the transition portion (26) is generally curved and connects the seat back portion (24) of the molded chair shell (20), which lies in a generally vertical plane, to the seat bottom portion (22) of the molded chair shell (20), which lies in a generally horizontal plane.

Accordingly, as illustrated in FIG. 1, the front side (24a) of the seat back portion (24), the front side (26a) of the transition portion (26), and the top side (22a) of the seat bottom portion, together, form a generally smooth and continuous surface on a front side of the molded chair shell (20) suitable for providing a user with a comfortable seating surface. Similarly, in some embodiments, the back side (24b) of the seat back portion (24), the back side (26b) of the transition portion (26), and the bottom side (22b) of the seat bottom portion, together, form a generally smooth and continuous surface on a back side of the molded chair shell (20).

Figure 2:
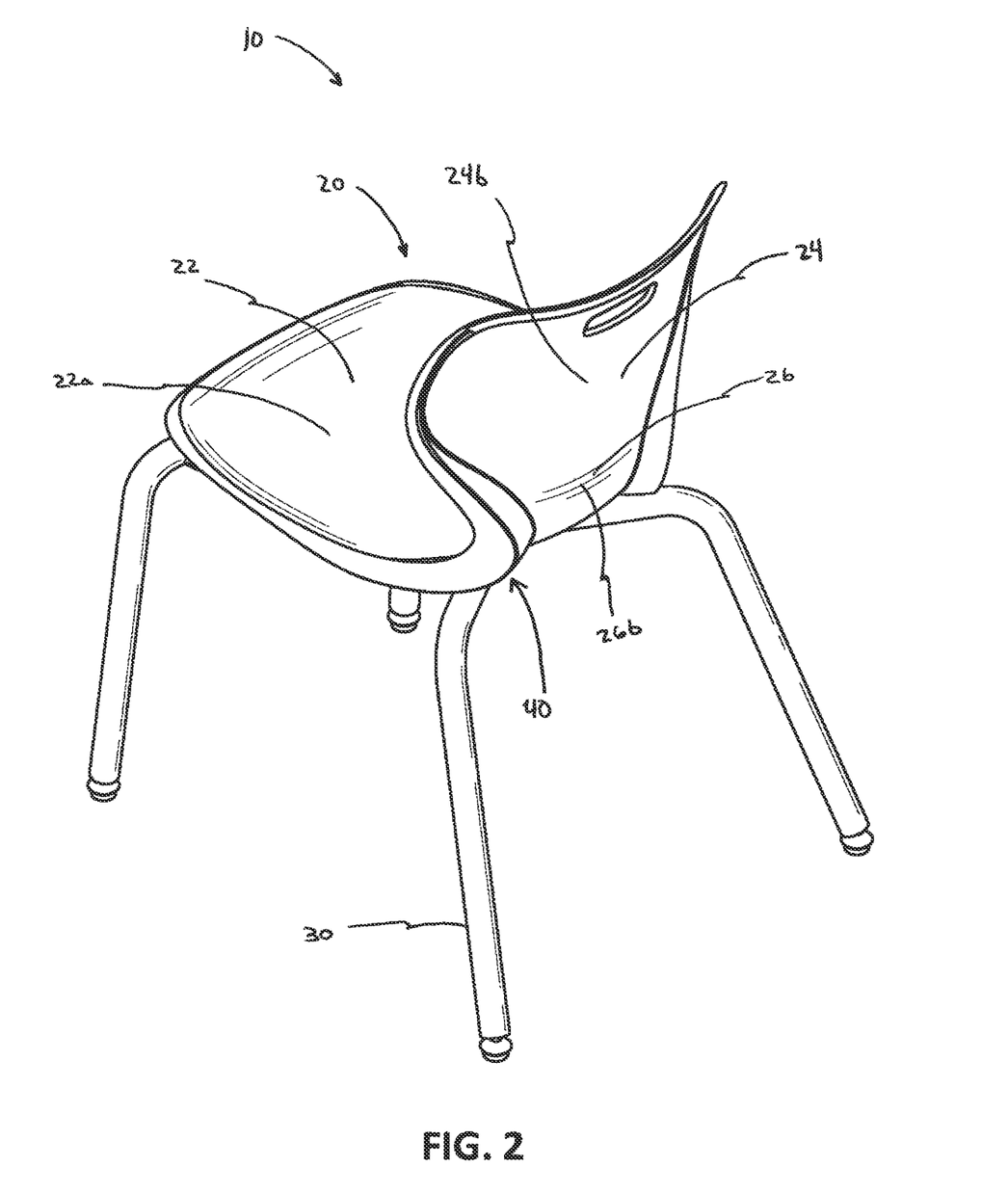
FIG. 2 a back perspective view of the molded chair illustrated in FIG. 1, according to some embodiments.

Referring now to FIG. 2, in various embodiments, the molded chair shell (20) includes one or more integrated hollow support members (40). Each integrated hollow support member (40) provides for added durability, stability, and strength, while enabling the molded chair shell (20) to flex, as discussed in greater detail below. Generally, the integrated hollow support members (40) are formed using a gas assisted injection process wherein nitrogen, or another suitable gas, is injected into a mold cavity configured to form the molded chair shell (20). Specifically, the gas assisted injection process occurs concurrently with the formation of the molded chair shell (20) during the above-discussed injection molding process.

In some embodiments, each integrated hollow support member (40) comprises a designated length and a plurality of terminating ends. In one such embodiment, the designated length is such that the integrated hollow support member (40) extends outwardly along the transition portion (26). That is, each end of the integrated hollow support member (40) terminates along the transition portion (26). In some embodiments, as discussed in greater detail below, the integrated hollow support member tapers towards its termination ends such that it terminates into transition portion (26).

In another embodiment, the designated length is such that the integrated hollow support member (40) extends outwardly along the transition portion (26), the seat back portion (24), and the seat bottom portion (22). In some embodiments, the integrated hollow support member (40) takes on an S-shape (or an otherwise curved shape) as it extends along the transition portion (26), the seat back portion (24), and the seat bottom (22), as is illustrated in FIGS. 4 and 8. Specifically, from the transition portion (26), the integrated hollow support member (40) extends both upwardly toward a top section of the seat back portion (24) and forwardly toward a front section of the seat bottom portion (22). In some embodiments, a first end of the integrated hollow support member (40) terminates along the seat back portion (24), and a second, different end of the integrated hollow support member (40) terminates along the seat bottom portion (22). In another embodiment, the first end of the support member terminates at a top section of the seat back portion (24). Similarly, in some embodiments, a second, different end of the integrated hollow support member (40) terminates at a front section of the seat bottom portion (22). In other embodiments, the integrated hollow support member (40) extends along the seat back portion (24) and the transition portion (26), yet terminates into the transition portion (26). That is, in some embodiments, the integrated hollow support member does not extend along the seat bottom portion (22). In still other embodiments, the integrated hollow support member (40) extends along the seat bottom portion (22) and the transition portion (26), yet terminates into the transition portion (26). That is, in some embodiments, the integrated hollow support member does not extend along the seat back portion (24). In some embodiments, the integrated hollow support member (40) is integrally formed with the transition portion (26), the seat back portion (24) and the seat bottom portion (22).

As mentioned above, in various embodiments, the integrated hollow support member (40) tapers as it extends outwardly from the transition portion (26). In some embodiments, a height of the integrated hollow support member (40) tapers as the integrated hollow support member (40) extends outwardly from the transition portion (26), the height being measured between a back side of the chair (comprised of the back side (24b) of the seat back portion (24), the back side (26b) of the transition portion (26), and the bottom side (22b) of the seat bottom portion (22)) and a joint between a first and second side wall (discussed further below and illustrated in FIGS. 9 and 10) of the integrated hollow support member (40). In some embodiments, as the height decreases as it tapers. In some embodiments, the height of the integrated hollow support member reaches a maximum along the transition portion (26). In some embodiments, the height reaches a minimum along the seat bottom portion and/or along the seat back portion, such as where the integrated hollow support member (40) terminates into the seat back portion (24) and/or the seat bottom portion (22).

In some embodiments, a width of the integrated hollow support member (40) tapers as the integrated hollow support member (40) extends outwardly from the transition portion (26), the width being measured between a first joint and a second joint, the first joint being a joint between the first side wall and the back side of the molded chair shell (20) and the second joint being a joint between the second side wall and the back side of the molded chair shell (20). In some embodiments, as the width decreases as it tapers. In some embodiments, the width reaches a maximum along the transition portion. In some embodiments, the width reaches a minimum along the seat bottom portion and/or along the seat back portion, such as where the integrated hollow support member (40) terminates into the seat back portion (24) and/or the seat bottom portion (22).

In some embodiments, the height and the width of the integrated hollow support member (40) each taper as the integrated hollow support member (40) extends outwardly from the transition portion (26). In yet some other embodiments, a shape factor (such as a triangular shape factor or cross-sectional area) tapers as the integrated hollow support member (40) extends outwardly from the transition portion (26). In some embodiments, as a shape factor tapers, the cross-sectional area of the integrated hollow support member (40) decreases.

For example, as is illustrated in FIGS. 5 and 6, integrated hollow support member (40) tapers as it extends toward the top section of the seat back portion (24) and tapers as it extends toward the front section of the seat bottom portion (22). In this illustrated example, the integrated hollow support member (40) tapers in that a shape factor (see discussion above) or cross-sectional area of the integrated hollow support member (40) tapers (or otherwise decreases) as the integrated hollow support member (40) extends outwardly from the transition portion (26). In various embodiments, each end of the integrated hollow support member (40) tapers into the respective surface at which it terminates. For example, if a first end of the integrated hollow support member (40) terminates at a front portion of the bottom side (22b) of the seat bottom portion (22), then the first end of the integrated hollow support member (40) tapers into the bottom side (22b) of the seat bottom portion (22). Similarly, if a second end of the integrated hollow support member (40) terminates at a top portion of the back side (24b) of the seat back portion (24), then the second end of the integrated hollow support member (40) tapers into the back side (24b) of the seat back portion (24).

Figures 9, 10:
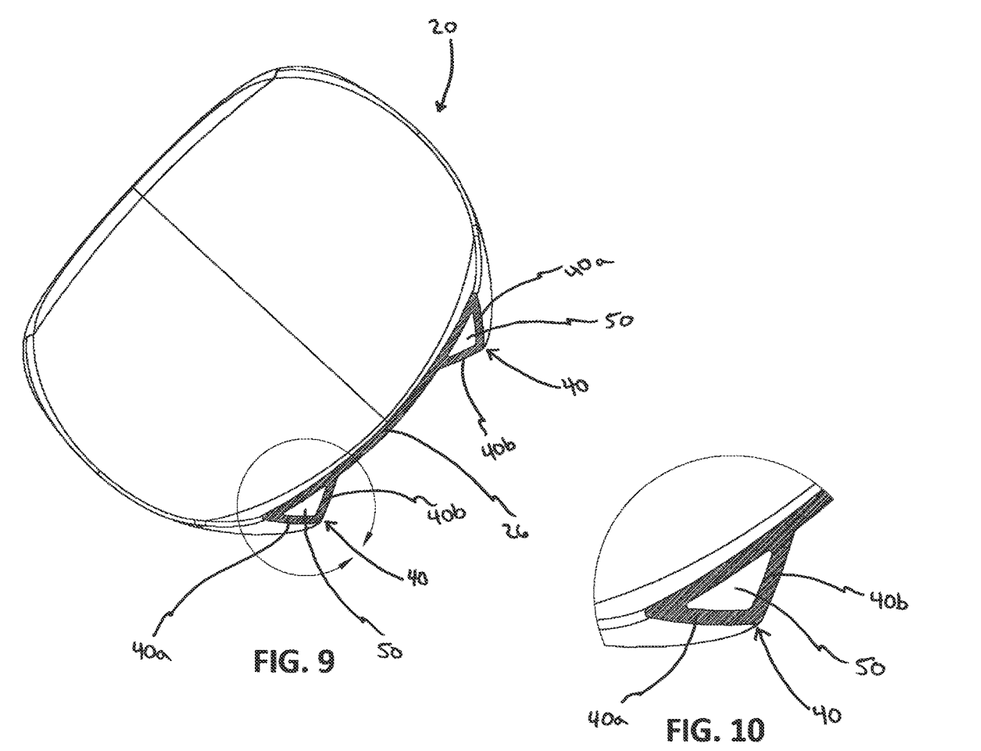
FIG. 9 is a cross-sectional view of FIG. 5, illustrating a plurality of integrated hollow support members, according to some embodiments.
FIG. 10 is a detailed view of what is illustrated in FIG. 9, according to some embodiments.

In various embodiments, the integration of a hollow support member (40) with the molded chair shell (20) creates a hollow enclosure (50) having a plurality of side walls, such as side wall 40a and side wall 40b, illustrated in FIGS. 4, 9, and 10. In some embodiments, the hollow enclosure (50) is integrally formed with the molded chair shell (20), including the seat bottom portion (22), the seat back portion (24), the transition portion (26), and the integrated hollow support member (40). In some embodiments, the plurality of side walls (40a and 40b) are each of a substantially uniform thickness. In some embodiments, the hollow enclosure created by the integration of a support member (40) with the molded chair shell (20) comprises a triangular cross-section, as is illustrated in FIGS. 9 and 10. In one such embodiment, the triangular cross-section extends along an entire length or along a substantial portion of the entire length of the integrated hollow support member (40). Accordingly, the entire length or a substantial portion of the entire length of the integrated hollow support member (40) is hollow.

Additionally, as discussed above, each incorporated hollow support member (40) is separate and independent of every other incorporated hollow support member (40) and is integrally formed with the molded chair shell (20). Specifically, each hollow enclosure is separate and independent of every other hollow enclosure created by every other incorporated hollow support member (40). For example, as is illustrated in FIG. 9, each of the hollow enclosures (50) created by side walls 40a, 40b, and the corresponding chair shell surface (such as back side (24b), back side (26b), or bottom side (22b)) are separate and independent from each other. In this illustrated example, because the integrated support members (40) are outwardly spaced along the peripheral edge of the molded chair shell (20), the integrated hollow support members (40), and thus the corresponding hollow enclosures (50), are separated by a portion of the seat back portion (24), the transition portion (26), and/or the seat bottom portion (22). It should be appreciated that by integrating hollow support members (as opposed to solid support members) unnecessary excess material is avoided, thereby creating an efficient, light weight design that is stable, durable, and flexible.

In some embodiments, the cross-sectional area of the hollow enclosure (50) remains constant along the entire length or substantially along the entire length of each integrated hollow support member (40). In another embodiment, the cross-sectional area (e.g., triangular cross-sectional area) of the hollow enclosure (50) varies along the length of each integrated hollow support member (40). In one such embodiment, the cross-sectional area diminishes towards each termination end of the integrated hollow support member (40). That is, while the cross-section generally maintains the same overall shape, such as a triangular cross-section, the cross-sectional area of that cross-section changes along the length of each integrated hollow support member (40).

In some embodiments, the cross-sectional area change is effectuated by increasing, or alternatively, decreasing, a width measured between side walls 40a and 40b, such as where side walls 40a and 40b join with the back side of the molded chair shell (20). In some embodiments, by increasing, or alternatively, decreasing, the width of side walls 40a and 40b, a distance from the molded chair shell (20) to a joint between side walls 40a and 40b increases (e.g., a height of the triangle of the triangular cross-section increases), or alternatively, decreases. In another such embodiment, by increasing, or alternatively, decreasing, the width of side walls 40a and 40b, a distance from a base of side wall 40a (i.e., where side wall 40a joins with the molded chair shell (20)) to a base of side wall 40b (i.e., where side wall 40a joins with the molded chair shell (20)) increases, or alternatively, decreases (e.g., a width of the base of the triangle of the triangular cross-section increases, or alternatively, decreases). In yet another such embodiment, by increasing, or alternatively, decreasing, the width of side walls 40a and 40b, both the height and the width of the triangle of the triangular cross-section increase (or alternative, decrease), thereby increasing (or alternatively, decreasing) the cross-sectional area. In yet some other embodiments, the cross-sectional area change is additionally or alternatively effectuated by increasing, or alternatively, decreasing, a wall thickness of one or more of side walls 40a and 40b.

In some embodiments, as the cross-sectional area of a triangular cross-section changes, the angles between the side walls (such as the angle between side wall 40a and 40b) remain constant. In other words, each side wall experiences a reduction in length equal to the reduction in length of every other side wall comprising the triangular cross-section. On the other hand, in some embodiments, as the cross-sectional area of a triangular cross-section changes, the angles between the side walls (such as the angle between side wall 40a and 40b) increases, or alternatively decreases. Such angular changes can be effectuated by altering the length of one or more of the walls making up the triangular cross-section. For example, if a base length of the triangular cross-section (measured, for example, along the back side (26b) of the transition portion (26) and between where side wall 40a joins the transition portion (26) and where side wall 40b joins the transition portion (26)) remains constant while a length of each of side walls 40a and 40b decreases, the angular relationship between side walls 40a and 40b increases (that is, approaches 180 degrees as the length of each of side walls 40a and 40b increases). In this example, a height of the triangle of the triangular cross-section decreases as the length of each of side walls 40a and 40b decrease. Conversely, in another example, if the base length of the triangular cross-section remains constant while a length of each of side walls 40a and 40b increases, the angular relationship between side walls 40a and 40b decreases (that is, approaches 0 degrees as the length of each of side walls 40a and 40b increases). In this example, a height of the triangle of the triangular cross-section increases as the length of each of side walls 40a and 40b increases. It should be appreciated that, by adjusting the corresponding height of the triangle of the triangular cross-section such that the angular relationship between side walls 40a and 40b is adjusted, the structural stability and flexibility of the integrated hollow support member (40) is adjusted. Accordingly, the disclosed molded chair assembly disclosed herein can be uniquely tailored to flex and/or maintain structural stability or rigidity at designated points.

In some embodiments, the integrated hollow support member (40) is positioned along the molded chair shell (20) such that the largest cross-sectional area of the integrated hollow support member (40) is appropriately located to provide a desired amount of strength, durability, and flexibility. In some embodiments, the integrated hollow support member (40) is positioned along the molded chair shell (20) such that its largest cross-sectional area is located at a high stress and/or a high strain position of the molded chair shell (20), such as the transition portion (26). By strategically locating the largest cross-sectional area of each integrated hollow support member (40) at high stress and/or high strain areas of the molded chair shell (20), stress can be appropriately distributed throughout the molded chair shell (20) and the integrated support members (40), thereby increasing stability and durability, while maintaining flexibility of the molded chair assembly (10).

As discussed above, integrating one or more hollow support members (40) into molded chair shell (20) according to the above-discussed configurations provides considerable structural strength and durability, while still permitting a desired degree of flexibility. While the integrated hollow support members (40) discussed above comprise triangular cross-sections, other suitable support member configurations comprising different cross-sections, such as rectangular cross-sections and the like, are also envisioned and can be incorporated without departing from the spirit or scope of the molded chair assembly (10) disclosed herein. Additionally, it should be appreciated that any number of the above discussed integrated hollow support members (40) may be incorporated into the molded chair shell (20). Similarly, while the above-discussed configurations include locating one or more integrated hollow support members (40) along the peripheral edge of the molded chair shell (20), in various alternative embodiments, one or more of the integrated hollow support members (40) disclosed herein may be incorporated into the molded chair at any desired location (including locations different from a peripheral edge).

In various embodiments, each integrated hollow support member (40) conforms to the shape and contours of the molded chair shell (20) such that a hollow cross-section (e.g. triangular or, alternatively, rectangular, etc) is maintained. For example, as illustrated in FIGS. 4 and 8, an integrated hollow support member (40) extends along a side (10*a*) of the molded chair shell (20). Specifically, in this illustrated example, the support member is integrated into the molded chair shell (20) at the back side (24*b*) of the seat back portion (24), the back side (26*b*) of the transition portion (26), and the bottom side (22*b*) of the seat bottom portion (22). In this illustrated example, the integrated hollow support member (40) extends along a portion of the molded chair shell's periphery edge (such as along a portion of the periphery edges 22*c*, 24*c*, and 26*c*). Accordingly, the integrated hollow support member (40) conforms to both the contours of the molded chair shell's periphery edge (comprised of periphery edges 22*c*, 24*c*, and 26*c*) as well as the surface contours of each of the bottom side (22*b*), the back side (26*b*), and the back side (24*b*).

In some embodiments, as seen in the illustrated example of FIG. 4, a second integrated hollow support member (40), which is independent, distinct, and separate from the first integrated hollow support member (40) (discussed above) is located, generally, along a second side (10*b*) of the molded chair shell (20). Put differently, the first and the second integrated hollow support members (40) are spaced outwardly from a centerline of the molded chair shell (20). In some embodiments, integrated hollow support members are equally spaced about a centerline of the molded chair shell (20). Similar to the first integrate support member (40), the second, different integrated hollow support member (40) conforms to the shape and contours of the molded chair shell (20). Accordingly, the first and the second integrated hollow support members, together, provide the molded chair shell (20) with sufficient support and durability by dissipating stress throughout both the transition portion (26) and the integrated hollow support member (40), as opposed to concentrating stress at the transition portion (26) as is the case where no support members are integrated into the molded chair shell (20). Additionally, the above discussed configuration provides that the molded chair shell (20) maintains a desired level of flexibility, thereby achieving a more comfortable seating configuration for the user. Specifically, the above discussed configuration permits the seat back portion (24) to flew and thereby change its angular position relative to the seat bottom portion (22) by way of the transition area (26) without overstressing the transition area (26) to the point of failure (either initially, or over a large cyclical period).

Moreover, by providing a molded chair shell (20) with a plurality of independent integrated support members (40), and specifically independent support members that are outwardly spaced about a centerline of the molded chair shell (20), the seat back portion (24) can flex, differentially from one side to another. Put differently, each independent integrated hollow support member (40) dissipates stress independent of each other independent integrated hollow support member (40).

Under such a configuration, any force (and/or deflection) transferred by a first integrated hollow support member to a second, different integrated hollow support member is first transferred into the seat back portion (24) (or, additionally/alternatively, transfer portion (26), and/or seat bottom portion (22)) before being transferred into the second integrated hollow support member.

In some embodiments, the molded chair assembly (10) disclosed herein is configured to be stackable vertically (one chair atop the next chair), horizontally (one chair nested in a juxtaposed position with the next chair), or both. For example, the bottom side (22*b*) of the seat bottom portion (22) is configured to rest upon the top side (22*a*) of the seat bottom portion (22), such that a first molded chair assembly can be stacked upon a second molded chair assembly, such that the first and second molded chair assemblies are in a nested configuration. While the example discussed above includes staking a first and a second molded chair assembly, it should be appreciated that any suitable number of molded chair assemblies may be positioned in a nested configuration. Examples of suitable, stacking and nest chair configurations are shown and described in U.S. Pat. No. 8,544,951, which is incorporated herein by reference.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the above described features.

The following is claimed:
1. A chair comprising:
a seat portion configured to accommodate a seated user;
a back portion configured to support a back of the seated user;
a transition portion located between the seat portion and the back portion, the seat portion, the back portion, and the transition portion being integrally formed;
a first support member located along a first side of the transition portion, the first support member being integrally formed with the transition portion such that the first support member and the transition portion form a first hollow enclosure, the first hollow enclosure having a length, a cross-sectional shape factor, and a width, wherein the cross-sectional shape factor of the first support member is constant along a substantial portion of the length of the first hollow enclosure, and the width of the first hollow enclosure is largest at the transition portion and decreases along the length of the first hollow enclosure along the back portion to a width that is smallest at a termination point furthest from the transition portion; and a second support member located along a second side of the transition portion laterally opposite the first side, the second support member being integrally formed with the transition portion such that the second support member and the transition portion form a second hollow enclosure, the second hollow enclosure having a length, a cross-sectional shape factor, and a width, wherein the cross-sectional shape factor of the second support member is constant along a substantial portion of the length of the second hollow enclosure, and the width of the second hollow enclosure is largest near the transition portion and decreases along the length of the second hollow enclosure along the back portion to a width that is smallest at a termination point furthest from the transition portion, and wherein the second hollow enclosure is separate and independent from the first hollow enclosure, the first support member being laterally separated from the second support member.

2. The chair of claim 1, wherein the first hollow enclosure is laterally offset from a midline of the transition portion toward the first side of the transition portion, and wherein the second hollow enclosure is laterally offset from the midline of the transition portion toward the second side of the transition portion such that a lateral distance separates the second support member from the first support member.

3. The chair of claim 1, wherein the first support member has three walls.

4. The chair of claim 1, wherein the first and second hollow enclosures each have a triangular cross-sectional shape factor.

5. The chair of claim 2, wherein the first support member includes a first wall extending outwardly from a first joint located between the first support member first wall and the back portion of the chair, the first joint being laterally offset from the midline of the transition portion toward the first side of the transition portion, and wherein the second support member includes a first wall extending outwardly from a second joint located between the second support member first wall and the back portion of the chair, the second joint being laterally offset from the midline of the transition portion toward the second side of the transition portion such that a positive lateral distance separates the first joint from the second joint.

6. The chair of claim 1, wherein the first support member is a mirror image of the second support member.

7. The chair of claim 1, wherein the first support member is configured to enable the chair to flex along the first side of the transition portion and wherein the second support member is configured to enable the chair to flex along the second side of the transition portion independent of the first support member.

8. The chair of claim 1, wherein the first support member and the second support member each extend beyond the transition portion to the seat portion and to the back portion.

9. The chair of claim 8, wherein the width of the first hollow enclosure tapers as the first support member extends outwardly from the transition portion and the width of the first hollow enclosure reaches a maximum at an inflection point located at the transition portion and reaches minimums at the back portion and at the seat portion.

10. The chair of claim 8, wherein the width of the second hollow enclosure tapers as the second support member extends outwardly from the transition portion and the width of the second hollow enclosure reaches a maximum at an inflection point located at the transition portion and reaches minimums at the back portion and at the seat portion.

11. A chair comprising:
a seat portion having an inner facing surface and an outer facing surface;
a back portion having an inner facing surface and an outer facing surface and including a first side portion, a second side portion laterally opposite the first side portion, and a middle portion separating the first side portion from the second side portion;
a transition portion interconnecting the seat portion and the back portion;
a first support member integrally formed with the outer facing surface of the back portion and extending along the first side portion of the back portion, the first support member including a plurality of structural support walls, a first one of the structural support walls of the first support member extending outwardly from a first joint located along the first side portion between the first support member first structural support wall and the outer facing surface of the back portion, the first joint being situated on the middle portion between the first and second side portions of the back portion, wherein the plurality of structural support walls of the first structural support member form a first hollow enclosure with the outer facing surface of the back portion and defines a width, the first hollow enclosure extending along the first side portion of the back portion, the width of the first hollow enclosure the largest at a location near the transition portion and smallest at a location furthest from the transition portion, the first hollow enclosure terminating at a top section of the back portion; and
a second support member integrally formed with the outer facing surface of the back portion and extending along the second side portion of the back portion such that the second support member is laterally offset and separate and independent from the first support member at the transition portion, the second support member including a plurality of structural support walls, a first one of the structural support walls of the second support member extending outwardly from a second joint located along the second side portion between the second support member first structural support wall and the outer facing surface of the back portion, the second joint being situated on the middle portion between the first and second side portions of the back portion and being laterally offset from the first joint such that the second support member is integrally formed with the back portion independent of the first support member, the plurality of structural support walls of the second structural support member form a second hollow enclosure with the outer facing surface of the back portion and defines a width, the second hollow enclosure extending along the second side portion of the back portion such that the second hollow enclosure is separate and distinct from the first hollow enclosure and separated from the first hollow enclosure, the width of the second hollow enclosure the largest at a location near the transition portion and smallest at a location furthest from the transition portion, the second hollow enclosure terminating at a top section of the back portion.

12. The chair of claim 11, wherein the seat portion includes a first side portion, a second side portion, and a middle portion separating the first side portion and the second side portion, wherein the first support member additionally extends along the first side portion of the seat portion, and wherein the second support member additionally extends along the second side portion of the seat portion.

13. The chair of claim 11, wherein the first hollow enclosure and the second hollow enclosure each have a triangular cross-sectional shape factor and a cross-sectional area.

14. The chair of claim 11, wherein a line drawn between an intersection of the plurality of structural support walls of the first support member and the outer facing surface of the back portion within the hollow enclosure defines a height of the hollow enclosure, and wherein the height of the hollow enclosure is greatest near the transition portion and smallest at a top of the back portion.

15. The chair of claim 11, wherein the first support member and the second support member each extend beyond the transition portion to the seat portion and to the back portion, and wherein the width of each of the first and second hollow enclosures tapers as the first and second support members extend outwardly from the transition portion and the width of each of the first and second hollow enclosures reach a maximum at an inflection point located at the transition portion and reaches minimums at the back portion and at the seat portion.

16. A method of manufacturing a chair, comprising:
  forming a chair back, a chair seat, and a transition portion located between the chair back and chair seat through a gas assist injection molding process, wherein forming the chair back and the chair seat includes forming a plurality of enclosed independent hollow structural support members integrally with the chair back and transition portion;
    wherein a first one of the plurality of independent hollow structural support members is formed along a first side of the chair back, has a length, a cross-sectional shape and a width, wherein the cross-sectional shape of the first support member remains constant along the length of the first support member, and the width of the first support member reaches a maximum near the transition portion and reaches a minimum at a location along the length of the first support member farthest from the transition portion at a terminal end;
    wherein a second one of the plurality of independent hollow structural support members is formed along a second lateral opposite side of the chair back, has a length, a cross-sectional shape, and a width, wherein the cross-sectional shape of the second support member remains constant along the length of the second support member, and the width of the second support member reaches a maximum near the transition portion and reaches a minimum at a location along the length of the second support member farthest from the transition portion; and
    wherein the first one of the plurality of independent hollow structural support members is spaced from the second one of the plurality of independent hollow structural support members by a lateral distance such that a hollow enclosure of the first one of the independent hollow structural support members is separate and distinct from a hollow enclosure of the second one of the independent hollow structural support members, and separated from the first hollow enclosure by a portion of the transition portion; and
  coupling legs to the chair seat.

17. The method of claim 16, wherein forming the chair back and the chair seat includes forming the plurality of independent hollow structural support members along opposite sides of the chair back such that they are situated on lateral opposite sides of the chair back.

18. The method of claim 17, wherein forming the chair back and the chair seat includes forming a middle seat portion located between the plurality of independent hollow structural support members, the middle seat portion having a smooth outer surface that provides for a smooth transition between the chair back and the chair seat.

19. The method of claim 16, wherein forming the chair back and the chair seat includes forming the plurality of independent hollow structural support members such that each of the plurality of independent hollow structural support members has a triangular cross-sectional shape factor and a cross-sectional area.

20. The method of claim 16, wherein forming the chair back and the chair seat includes forming the plurality of independent hollow structural support members such that each of the plurality of independent hollow structural support member are smaller towards a top of the chair back than towards a bottom of the chair back.

* * * * *